March 22, 1938.     W. L. HOBURG ET AL     2,112,196
WINDSHIELD WIPER OPERATING MEANS
Filed Sept. 19, 1935     2 Sheets-Sheet 1
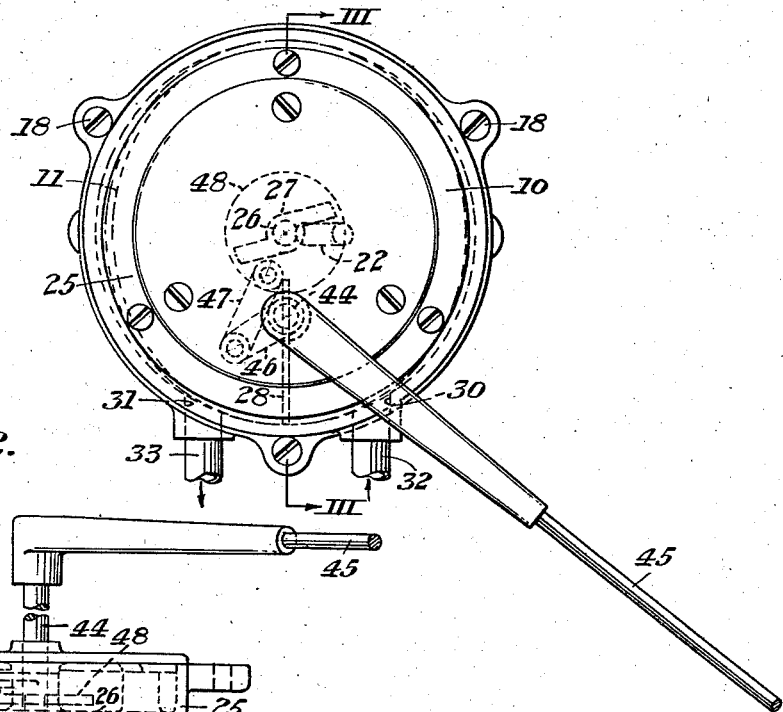
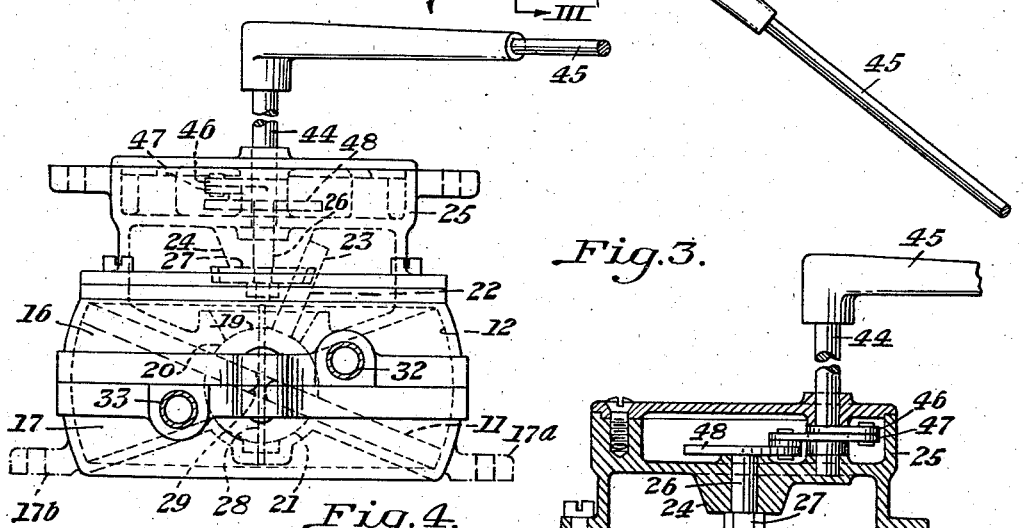
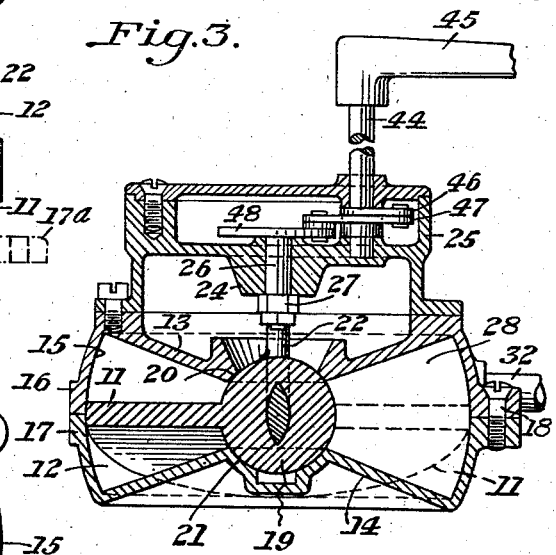
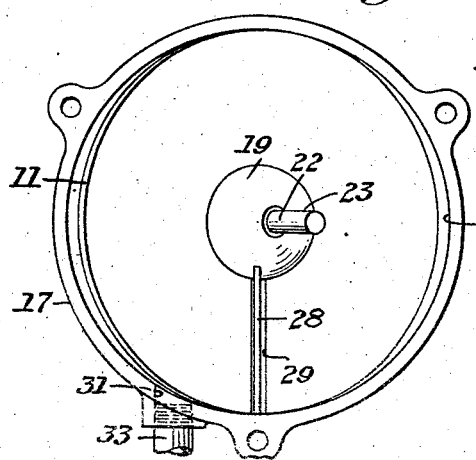
INVENTORS
William L. Hoburg,
Robert L. McCandless,
and Edward A. Berry,
by their atty's
Byrnes, Stebbins & Blenko March 22, 1938.   W. L. HOBURG ET AL   2,112,196
WINDSHIELD WIPER OPERATING MEANS
Filed Sept. 19, 1935    2 Sheets-Sheet 2
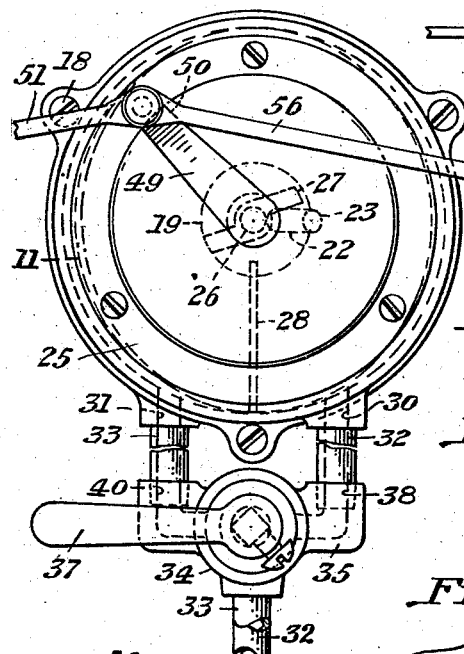
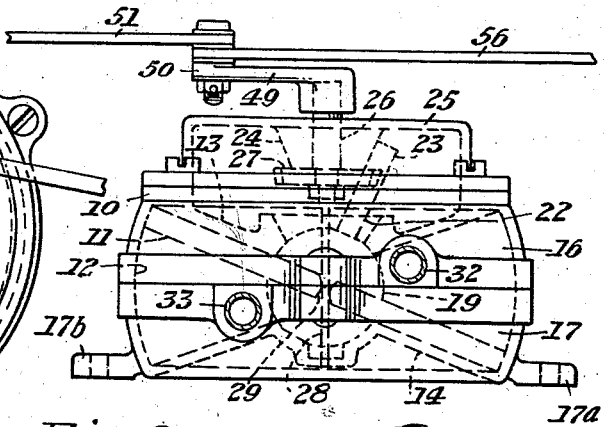
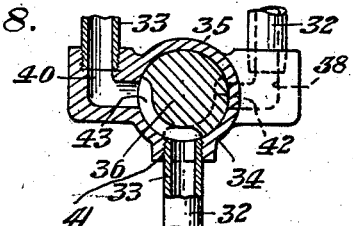
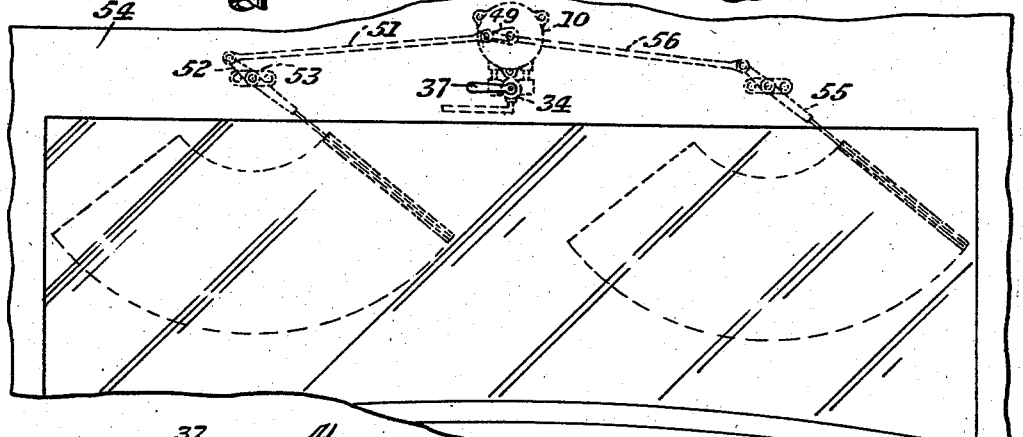
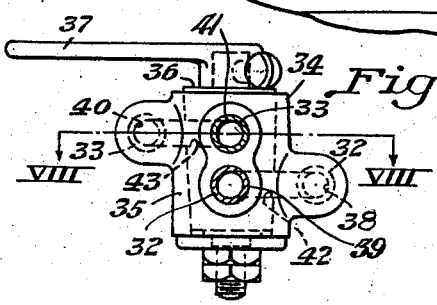
INVENTORS
William L. Hoburg,
Robert L. McCandless,
and Edward A. Berry,
by their atty's
Byrnes, Stebbins & Blenko

Patented Mar. 22, 1938

2,112,196

UNITED STATES PATENT OFFICE 2,112,196

WINDSHIELD WIPER OPERATING MEANS

William L. Hoburg, Glenshaw, Robert L. McCandless, Mars, and Edward A. Berry, Pittsburgh, Pa., assignors, by direct and mesne assignments, to said Hoburg Application September 19, 1935, Serial No. 41,262

4 Claims. (Cl. 121—69)

Our invention relates to automatic fluid pressure actuated windshield wiper operating means. The commonly known and popular type of windshield wiper motor, which is actuated by the difference in pressures between suction in a duct leading directly from the engine intake manifold and air at substantially normal atmospheric pressure, does not operate successfully under all conditions of operation of the motor vehicle to which it is attached. It is well known that the suction in the intake system of a combustion engine is irregular and varies widely between the times when the throttle of the engine is open and, when it is closed and under certain conditions of operation, the difference in pressures between the suction and atmospheric pressure is insufficient to actuate the windshield motor. Our device employs not only the suction of the motor, as aforesaid, but, also, the pressure in the exhaust system, and we have found that under all conditions of operation of the engine, the windshield motor will function positively and satisfactorily.

According to the present invention, there is provided a fluid actuated uni-directional motor having connections through which motion is transmitted to a wiper blade to oscillate it.

The motor is of a type in which a disc is mounted centrally upon a sphere which is seated in a spherical bearing formed at the convergence of two conical walls of an enclosing chamber having spherical side walls. The disc is arranged so that it will gyrate or rock circularly in a tilting or wabbling motion. The piston or disc is actuated by the difference in pressure between the suction in a duct leading directly from the engine intake system and pressure in a duct leading from the exhaust system to the wiper motor.

In the accompanying drawings, illustrating the present preferred embodiment of our invention, and in which like numerals are employed to designate corresponding parts throughout the same, Figure 1 is a top plan view of the apparatus;

Figure 2 is a view in side elevation of the apparatus;

Figure 3 is a cross-sectional view along the lines III—III of Figure 1;

Figure 4 is a plan view of the motor with one section of the casing or housing removed;

Figure 5 is a top plan view of a modification of the apparatus;

Figure 6 is a view in side elevation of the apparatus shown in Figure 5;

Figure 7 is a detail of a valve for use with the apparatus;

Figure 8 is a sectional view along the line VIII—VIII of Figure 7; and

Figure 9 is a view of one form of the apparatus mounted in position on a windshield.

In the drawings, 10 designates a fluid-actuated motor, in which an actuating disc or piston 11 is disposed within a chamber 12. The end walls 13 and 14 of the chamber have a truncated cone shape and the side wall 15 is a surface of revolution generated by a spherical arc. The motor casing or housing may be conveniently made in two parts 16 and 17 and fastened together by screws 18. Lugs 17a and 17b are provided whereby the motor may be attached to the windshield frame.

The disc 11 is secured in a diametrical position upon a spherical member or bearing ball 19, which is seated in the bearings 20 and 21 formed on the conically converging end walls 13 and 14. A spindle 22 projects radially from the ball 19 outwardly and at right angles to the horizontal plane of disc 11. The outwardly projecting end 23 of the spindle is restrained by the frusto-conical guide member 24 secured to the cover plate 25, so as to cause the spindle to move in a uni-directional circular path. Journaled axially on member 24 is a shaft 26 which has at one end a lever member 27 secured thereto. The disc 11 when actuated will cause shaft 22 to move counterclockwise and will press against lever 27 and thus turn shaft 26, which, in turn, will oscillate the wiper blade through connections later to be described. The opposite end of the shaft is secured to means, which we shall hereinafter describe, which are suitable for transmitting the motion of shaft 26 to the desired point of application. The disc 11 is prevented from rotating in its own plane about its vertical axis by a partition 28 which extends transversely between the end walls 13 and 14 and radially from the side wall to the ball 19. The partition passes through a radial slot 29 in the disc. The adjoining walls of the disc are shaped so that there is a working fit between the partition and the side walls of the slot in all positions, and there is a working fit between the spherical side walls of the chamber 12 and disc 11.

Formed in the side wall 15 of chamber 12 are openings 30 and 31. Opening 30 is connected to a suitable pipe or duct 32 leading to the exhaust system of the motor (not shown) while opening 31 may be connected by means of a suitable pipe or duct 33 to the intake system of the engine (not shown). The openings 30 and 31 are disposed on opposite sides of the partition 28. The pipes or ducts 32 and 33 have a control valve 34 (illustrated in Figures 5, 7, and 8) connected to both.

The control valve 34 has a shell portion 35 in which is fitted a plug 36 controlled by handle 37. Formed in the shell are openings 38, 39, 40, and 41. Openings 38 and 39 are connected by way of passageway 42 while openings 40 and 41 are connected by way of passageway 43, which passageway may be opened and closed by suitable manipulations of plug 36. One portion of the duct 32 connects opening 38 and opening 30, while one portion of the duct 33 connects opening 40 and opening 31.

When the valve 34 is open pressure from the exhaust system will pass through pipe 32, and opening 30 into chamber 12 to the right of partition 28 and above disc 11 (when the disc is in the position illustrated in Figures 2 and 6) and then sweep around the disc and out through opening 31, thence through pipe 33 to the intake system. This will cause the disc 11 to move in a gyratory direction just like a top which is about to stop spinning and will communicate counter-clockwise rotary motion to shaft 26. If it is desirable that the shaft 26 turn in a clockwise direction, it is only necessary to connect opening 31 to the exhaust system and opening 30 to the intake system.

In Figures 1, 2, and 3 there is illustrated a windshield wiper motor to the top plate 25 of which the windshield wiper shaft 44 is connected. This shaft has fastened thereto the wiper arm 45 to which the wiper blade (not shown) is attached. Shaft 44 moves in an oscillatory fashion and consequently the wiper arm and attached wiper blade are moved through the desired arc. The shaft 44 is journaled in the top or cover plate 25 and has fastened to it a lever 46 which in turn is pivotally connected by link 47 to the disc or plate 48, which is secured to the outer end of shaft 26. Rotation of shaft 26 and plate 48 will cause the shaft 44 to oscillate and move the wiper arm 45 back and forth in a sweeping arc.

Another form of crank and rocker driving connection between the motor and the wiper blade is illustrated in Figures 5, 6, and 7. In this modification, the shaft 26 has secured thereto an arm 49 which, when the motor is operating, travels in a uni-directional circular path. The end 50 of arm 49 distant from driving shaft 26 is pivotally connected to one end of a rod 51, the other end of which is pivotally connected to the wiper arm 52 which in turn is pivotally fastened by bracket 53 to windshield frame 54. Similarly, arm 49 is connected to wiper arm 55 by rod 56. Of course, the arrangement will work equally well when connected to one windshield wiper arm or to more than one.

When it is desired to operate the wiper, which, of course, will operate only when the car engine is running, the valve arm 37 is turned to the position shown in Figure 5. This places one side of the disc 11 in communication with the exhaust system by way of pipe 32 and pressure above atmospheric will be exerted on the disc and this pressure added to that caused by the less than atmospheric pressure on the opposite side of the disc, due to the less than atmospheric pressure in the intake manifold, to which it is connected through communicating pipe 33, will cause the disc 11 to gyrate. The shaft 26 will then turn counterclockwise and move lever arm 27, shaft 26 to which it is attached and through the linkage 47 and arm 46, see Figure 1, will cause shaft 44 to oscillate and move the wiper blade attached to wiper arm 45 back and forth in an arc. In the modification shown in Figure 5, the turning of shaft 26 will cause arm 49 to move counterclockwise through 360° and this turning will impart to arms 51 and 56 a reciprocating motion which will cause the wiper arms 52 and 55, respectively, to move in the arc of a circle since these arms are pivoted to the windshield frame 54.

By our invention, we have provided a simple and satisfactory windshield wiper and one in which the motor is simple and positive in operation under all conditions of operation of the engine to which it is connected. The apparatus has no valves to get out of order and is thoroughly dependable and powerful, and withal compact and economical to manufacture.

While we have shown and specifically described certain present preferred embodiments of our invention, it will be understood that the invention may be otherwise constructed and embodied within the scope of the following claims.

We claim:

1. Operating means for a windshield wiper of a combustion engine driven vehicle, comprising a fluid pressure motor of the type having a wabbling diaphragm which is progressively tilted in a gyratory manner to produce unidirectional rotary motion and having opposed fluid pressure connections, one leading to the exhaust system and one leading to the intake system of the engine which drives said vehicle, means for transmitting said rotary motion of the diaphragm to the wiper as oscillatory motion, and means for simultaneously controlling said connections.

2. Operating means for a windshield wiper of a combustion engine driven vehicle, comprising a fluid pressure motor having opposed fluid pressure connections, one leading to the exhaust system of the engine which drives said vehicle, said motor being of the type having a wabbling diaphragm which is progressively operated to produce uni-directional gyratory motion, means for preventing the disc from rotating about its axis, and means for simultaneously controlling said connections.

3. Operating means for a windshield wiper of a combustion engine driven vehicle, comprising a fluid pressure motor, said motor having a chamber with two inwardly inclined conic heads and arcuate side walls, a bearing ball received in said chamber, a disc diametrically positioned upon the bearing ball and extending between the side walls, a radial partition extending from the bearing to the side walls and from one conic wall to the other, said disc having an opening therein through which said partition passes, fluid pressure connections, one leading to the exhaust system and one to the intake system of the engine, said fluid pressure connections communicating with the chamber on opposite sides of the partition and on opposite sides of the disc, a crank-and-rocker connection for transmitting the rotary motion of the disc to the wiper as oscillatory motion, and means for controlling said fluid pressure connections.

4. A windshield wiper operating means for use with a combustion engine driven vehicle, comprising a fluid pressure motor, said motor having a chamber with two inwardly inclined conic heads, an actuating disc in said chamber adapted to rock in a progressively tilting motion to produce uni-directional rotary motion, means passing through said disk for preventing it from rotating about its axis, said chamber having an opening in either side of said means and on opposite sides of the disc, a fluid pressure connection from one of said openings to the intake system of the engine, a fluid pressure connection from the other of said openings to the exhaust system of the engine, and means for simultaneously controlling both of said connections.

WILLIAM L. HOBURG.
ROBERT L. McCANDLESS.
EDWARD A. BERRY.